Oct. 18, 1966     B. G. HENSON ET AL     3,279,454

PROXIMITY ORCHARD HEATER

Filed Oct. 16, 1964

INVENTORS

Burton G. Henson &
Joseph L. Vincent

BY Thomas, Neisman & Russell

ATTORNEYS

United States Patent Office 3,279,454
Patented Oct. 18, 1966

3,279,454
PROXIMITY ORCHARD HEATER
Burton G. Henson, 1915 Bayshore Blvd., Tampa, Fla., and Joseph L. Vincent, Tampa, Fla.; said Vincent assignor to said Henson
Filed Oct. 16, 1964, Ser. No. 404,441
4 Claims. (Cl. 126—59.5)

This invention relates broadly to a heater for use in citrus groves and orchards, and more particularly, to the type of heaters employed to protect semi-tropical ornamental shrubbery and fruit bearing trees, or any other type of vegetation, both ornamental and commercial, from the ravages of frost or freezing conditions.

The invention is especially directed to providing a solution to the freezing problem resulting in extensive damage to citrus trees as well as the fruit thereon which has in the past plagued the citrus growers throughout the United States. Of the means thus far devised to prevent, or substantially mitigate, damage from freezes, a vast unmber of so-called orchard heater types, having varied designs, have been tried with only partial success. Of course, the ultimate purpose pervading all of these heater designs has been to maintain the temperature of the atmosphere contiguous with and about the trees above about 26 to 29 degrees, that being the temperature at which permanent damage to the orchard commences. The well known smudge pot, and other such heaters placed in between the rows of trees, sought to provide a blanket of warm air which is sustained about and over the trees by virtue of the accomypanying suspension of smoke particles. Other commonly employed heaters were either suspended from the tree branches, or else, used near the base of the tree in combination with an individual cover encasing each tree which in essence insulated the tree from the cold and aided in retaining the heat from the burner stationed therein closer to the tree. However, the types of heating devices placed in open fields have all proven to be ineffective against even the slightest of freezes in certain localities where movements of the air masses near the ground are usually accompanied by destructively low temperatures. In these localities, the heated air effluent from the various types of heaters tested was swept out of heat transfer contact with the trees, and in fact, the entire orchard was thus subject to and in jeopardy from the cold air and not given the measure of heat protection desired.

When heaters are used without an accompanying medium, such as the smudge or tree cover heretofore used to maintain the heat near the ground and about the trees, there is another disadvantage inherent in the form of heat transfer obtained. That is, the buoyant effect of the heated air from the heaters normally rises upwardly within the sea of surrounding colder air and hence this heat, when chimneyed upwardly in this manner, is lost to the upper atmosphere.

It can thus be seen, and as has been customarily shown, that slight winds in the vicinity of the orchard being heated may serve to disrupt the rising heated convective air currents. This combined effect tends to maintain at least an aliquot of the heat near the trees. An attendant disadvantage is that the rising heat may be blown out of contact from the trees and perhaps even entirely out of the orchard. Attempts thus far to economically distribute ubiquitously the heat generated throughout the orchard, without attendant soot or smoke, has been fraught with failure.

Still another difficulty, and perhaps as important as the type or form of warm air blanket covering the trees, has been the problem of reducing the cost of the devices heretofore utilized. Not only has the solution to the heat distribution pattern been presented by the instant invention, but a heater design has been provided which permits of prolonged and economical heating throughout the usual early morning hours during which the temperature dips to below freezing. In this regard, the usual type of fuels such as wood, oil and rubber, butane and coke, heretofore utilized in the conventional type of orchard heaters, have proven to be unduly expensive as well as too short lived in terms of rate of burning.

The heater of this invention obviates the problem of providing adequate heat distribution attendant upon the use of the above mentioned types of heaters. The system of protecting citrus trees embodied by our invention comprises a heater which discharges its heat at a point below the foliage near the trunk of the tree so that the tree itself will act as a canopy to retain the heat there under. Such a form of heat distribution and retention likewise makes it unnecessary to utilize the fuel which burns with the liberation of objectionable smoke. Instead, the scheme of heating employed herein makes it possible to burn in our heater one of the most abundant and economical fuels available.

It is therefore a primary object of this invention to provide an improved orchard heater, of economical design, and adapted to be positioned within an orchard in such manner that the heat emitted therefrom maintains the orchard at a safe temperature; this plan of heating provides the further advantage that the heat liberated will not be readily disseminated to the atmosphere or easily swept away by the winds.

It is yet another object of this invention to provide an improved orchard-heater design which can be easily and economically fabricated from sheetmetal, and which, because of its unique shape, cannot be positioned close enough to the tree to injure same when operated.

It is a further objective of my invention to provide an improved orchard heater adapted to be operated with an economical semi-flameless fuel of great thermal quality which will slowly exude even heat over a long and continuous period of time without intermittent refueling.

It is still another object of this invention to provide an improved fuel package for use in our improved orchard heater which is desirable for shipping and storage in separate containers in the open fields. Such a convenient fuel package is protected from the hazards of fire when stored and also will retain its fuel value even against the rain, heat, cold or evaporation from season to season, rendering unnecessary uneconomical storage in sheds or warehouses, etc.

Another objective of our invention is the provision of an improved fuse or squib which can be stored in the open fields, being completely free from the deleterious effects of the erosive forces of weather.

Yet another object of this invention is to provide an improved fuse which is to be placed underneath the fuel contained in our improved orchard heater and which can be easily lit, even when wet with rain, to provide heat sufficient to ignite the primary fuel source thereabove.

Further objects and advantages will become apparent from the following description, made with reference to the accompanying drawings wherein like numerals indicate like parts and wherein.

Figures 2, 3:
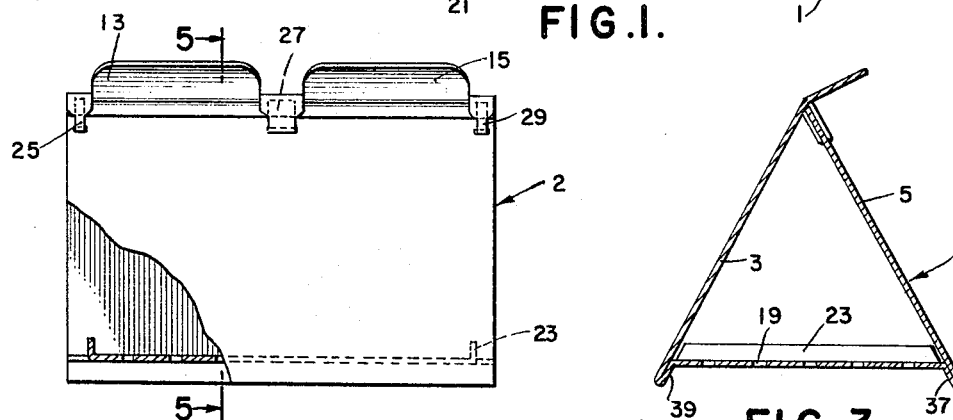
FIGURE 2 is a side view, in partial cut-away section, of our improved orchard heater, particularly illustrating the manner in which the ends of the sheetmetal are united at its uppermost edge.
FIGURE 3 is a sectional end view taken on the line 5—5 of FIGURE 2, such depicting the dimensional relationship between the sides and the form taken by appropriate bending of the preshaped sheet of FIGURE 1.
Figure 4:
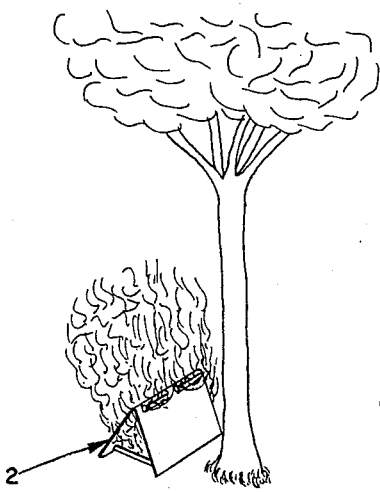
FIGURE 4 represents a somewhat diagrammatic view of our improved orchard heater, such illustrating the device in operative position adjacent a tree to be protected by the heat emanating therefrom; this view especially demonstrating the orientation of the ports of the upper edge of the heater with respect to the tree trunk.
Figure 5:
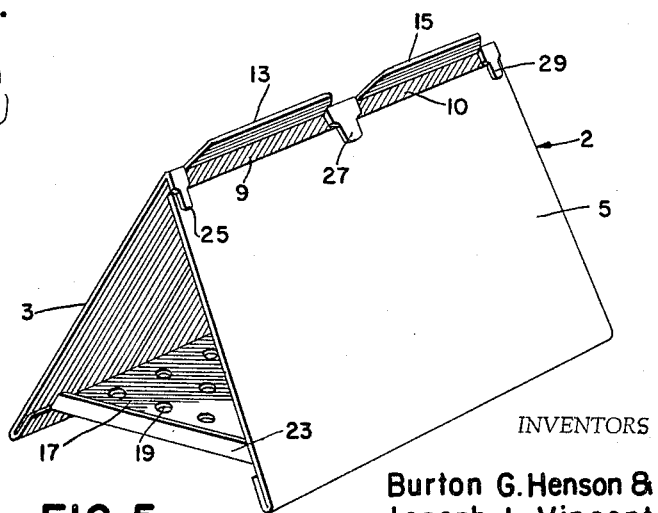
FIGURE 5 is an oblique perspective view of the invention designed to illustrate the relationship between the several perforations and the floor of the chamber in which fuel is to be charged during operation thereof.

Referring more particularly to these drawings of the invention, it will be seen that a triangularly or oval shaped metal directional heater is formed from one piece of sheetmetal, as generally indicated at 1. When bent to shape, as generally indicated at FIGURES 3, 4 and 5, the structure comprises two slanted sides 3 and 5, united at the top seam 7, at which point rectangular gas flues 9 and 10 are formed between the opposing slanted sides to permit escape of the heat of combustion therethrough (FIGURES 2 and 3). Deflector plates 13 and 15, extending over and above flue ports 9 and 10 respectively, outwardly deflect the heated gas effluent to prevent the same from rising as a chimney of heat, hence causing its distribution under the foliage of the tree.

In a preferred embodiment of our invention a flat base portion 17, perforated with circular holes 19, is provided as a floor or grate on which the combustibles are placed. Plate 17 is located relative to slanted sides 3 and 5 at a position of from 1 to 3 inches above the ground; which height is dependent upon the contour of the earth on which the heater is to rest and the amount of fuel needed in the stove at any particular locality.

It is contemplated that holes 19 may be replaced by louvers, or some such draft means which will be spaced symmetrically about base 17 so as to provide an even draft to the fuel resting thereon. In any event, it has been found that sustained burning at a more even combustion rate is achieved when draft holes, either of the circular or rectangular louver slit variety, occupy a certain area of the base plate.

Not all types of grates or perforated plates will be suitable for the intended use herein; however, heaters of this type must provide, with a given kind of fuel, enough air to maintain combustion without causing the fuel to be consumed too readily. In the case of our heater using coal as a fuel, it has been determined that it is preferable to utilize a base plate wherein the ratio of the area of the plate to the area of the holes therein is between about 40 to 60.

Since freeze or frost temperatures causing damage to the orchard may begin in the early part of the night and remain until morning when the sun generates enough heat to warm the atmosphere above freezing, it is a practical necessity that a stove be used which need only be lit and attended once in the night. The orchard heater of this invention avoids refueling and will burn during the critical periods of freezing for periods up to 9 hours with just one charge of 10 pounds of coal. The achievement of these surprising and unexpectedly long combustion periods with coal as the fuel, is attributed in part to the type of grate or floor used. The particular grate of this invention has a predetermined area cut therein to permit a certain quantity of air to be admitted underneath the fuel load.

Small rectangular segments 21 and 23, lying on the opposite sides of base plate 17, are folded upwardly, as particularly illustrated in FIGURES 2 and 3. These aid in retaining the igniter and fuel charge thereon within the combustion chamber. Folding tabs 25, 27 and 29 are so formed as to extend from the end of sheet 1 to a position adjacent wall 3 in such manner as to be inserted, when in folded position, in slots 31, 33 and 35, respectively. In this connection, it is to be observed that these tabs extend only partially into the slots since it is desired that walls 3 and 5 be slightly spaced apart near the apex of the triangular combustion chamber.

Figure 1:
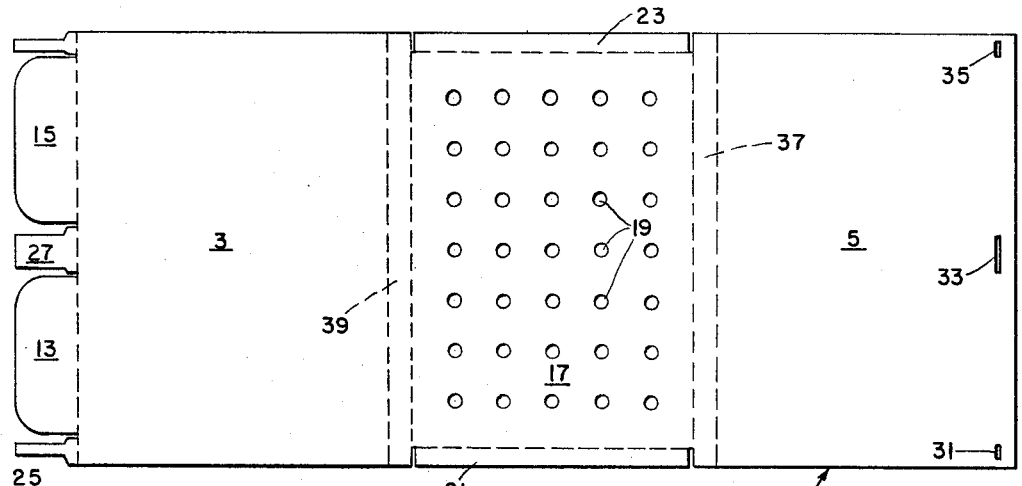
FIGURE 1 is a plan view of the invention; here a flat sheetmetal piece has been perforated and cut into a pattern adapted to be bent into a complete orchard heater without the need of any other fastening means.

The rectangular portions 37 and 39, extending across the width of sheet 1, FIGURE 1, lie adjacent base section 17 and slanted walls 3 and 5, thus forming the inside walls of the legs. The latter extend downwardly and outwardly from the edge of the triangular combustion chamber to prevent direct contact of the combustion chamber with the tree. Hence, even when the heater is carelessly placed in contact with the trunk, the outwardly extending support legs will first come into contact with the tree only at the lower edge thereof. Consequently, it can be seen that these legs mitigate or prevent the damage which would otherwise occur if the hot walls of the combustion chamber were to touch the tree trunk.

To make possible the rapid ignition of the fuels contained in my heater, which incidentally is essentially to the success of any such device, an ignition trigger of our design will eliminate the long periods usually required to ignite the primary coal fuel. Such a trigger preferably comprises rectangular sheets of cardboard or corrugated paper sized to fit conveniently within and on the floor of the combustion chamber. These should be previously impregnated with a highly combustible petroleum hydrocarbon. It has been found that inexpensive petroleum residues, and even crudes, partially jelled with aluminum stearate will be readily ignited merely by touching same with a torch, and will also lend enough fuel value to the impregnated paper strips to raise the temperature of the primary coal fuel to the combustion point thereof.

It is also contemplated to utilize fuel packaged in a way which renders same suitable for storage in the open fields when not in use. A fuel load of ten pounds of coal, which may be either anthracite or bituminous, is encased in a first paper bag and covered on the outside by a second bag which is preferably a water repellant plastic, such as a polyethylene bag, the latter being sufficient to keep the coal relatively dry and in condition for use. It may be desired to use a triangularly shaped cardboard container for the fuel which will easily slide into the combustion chamber and reduce the problems in loading the heater. In any event, it is necessary to charge only about ten pounds of coal to each heater to generate heat sufficient to provide an atmosphere of warm air about the tree throughout the night.

This invention exhibits the following safety feature: the ignition trigger which is covered by a plastic bag may be stored as a separate unit from the fuel package to prevent vandalism and to eliminate an attractive nuisance to minors and children who might be tempted to light the fuel package in the orchard. Without the ignition trigger, the coal or like fuel cannot be easily lighted by matches or other like conventional methods.

As for storage of these heaters and combustibles therefor, the same may conveniently be stored in the customary cultivated area about the base of each tree. The heating spreader with sufficient amounts of fuel for several season requirements can safely remain in the uncultivated space beneath each tree from season to season; thereby eliminating the substantial cost of moving and storage as heretofore practiced and required with other heating fuels and devices used in the industry.

In forming the heater, the rectangular sheetmetal 1, perforated and patterned as shown in FIGURE 1, need only be folded on the dotted lines to the shape depicted in FIGURES 2, 3 and 5. The tabs 25, 27 and 29 inserted through slots 31, 33 and 35, respectively, are folded over against the inside of wall 5 to fixedly secure the walls together. Deflector plates 13 and 15 which project from the slanted wall 3 are then bent downwardly to an angle approaching the horizontal to act as a baffle against smoke and heat arising from flues 9 and 10. As a practical matter, precut sheets similar to one shown in FIGURE 1 may be sold and assembled in the field by the purchaser at the site of use. In such a case, the dotted lines along which the folds are to be made are preferably stamped with slight indentations to facilitate easier bending.

An orchard heater constructed in size to receive a ten pound charge of coal which is suitable to provide sustained burning for at least nine hours was two feet long, one foot wide across the perforated base plate 17, and approximately one and one-half feet high as measured along the sides from the ground to the apex of the triangular combustion chamber. A heater dimensioned thusly, or this approximate size, is small enough to be handled conveniently and also contain only enough coal, when fully charged with same, to burn through the critical hours of freezing during the night.

Operationally, it is only necessary to place the igniter package impregnated with petroleum hydrocarbons on the base 17 upon which an approximately ten-pound charge of coal is positioned. The heater, located within one to five feet of the three trunks, is then lit from below by means of a kerosene or gas torch, such as propane, and combustion then proceeds without interruption and re-ignition. The invention is not limited to any particular means of ignition; however, it could be ignited by electricity, radio frequency transmitters of known type, or some such other means.

It will thus be seen that there is provided a heater in which the several objects of the invention are achieved and which is well adapted to meet the conditions of the particular orchard heating problem herein analyzed. It is also to be understood that the heating device herein described and shown on the accompany drawings is to be interpreted as being illustrative only: it being further understood that the scope of the invention as to the orchard heater in general is to be limited only by such limitations or definitions as are present in the claims as appended hereto.

We claim:

1. A coal burning orchard heater adapted to be placed on the ground under the foliage of a tree near its trunk comprising a triangularly shaped combustion chamber formed of sheetmetal, said chamber having a base and slanted sides extending upwardly from said base toward an apex, said sides being spaced from each other at said apex to form flue ports, said base being provided with draft ports therein and being adapted to support fuel and an igniter thereon, said chamber being open at both ends and having a base area of from 40 to 60 times as large as said draft ports therein, horizontal deflector plates joined to one of said sides at the apex and extending immediately above said flue ports formed between said sides, and support legs attached to and extending downwardly from said combustion chamber base thereby raising the base portion thereof above the level of the ground to permit sufficient air to be introduced below the base.

2. The heater as defined in claim 1 wherein said legs extend downwardly, obliquely and outwardly from said combustion chamber whereby the hot combustion chamber will be separated from the tree when the bottom of said legs are in contact with the tree trunk.

3. The apparatus as defined in claim wherein said draft ports are uniformly spaced round holes.

4. The heater as defined in claim 1 wherein said heater comprises a single piece of sheetmetal bent into said triangular shaped combustion chamber.

References Cited by the Examiner

UNITED STATES PATENTS

| 922,478 | 5/1909 | Henry | 126—59.5 |
| 1,713,659 | 5/1929 | Karr | 126—59.5 |
| 1,975,102 | 10/1934 | Hothersall | 158—91 |
| 2,799,563 | 7/1957 | Shenker | 44—40 |

FOREIGN PATENTS

| 136,398 | 2/1950 | Australia. |
| 359,905 | 4/1930 | Great Britain. |
| 378,280 | 8/1932 | Great Britain. |

CHARLES J. MYHRE, *Primary Examiner.*